United States Patent [19]
Hull et al.

[11] Patent Number: 5,465,353
[45] Date of Patent: Nov. 7, 1995

[54] IMAGE MATCHING AND RETRIEVAL BY MULTI-ACCESS REDUNDANT HASHING

[75] Inventors: Jonathan J. Hull, Amherst, N.Y.; Peter E. Hart, Menlo Park, Calif.

[73] Assignees: Ricoh Company, Ltd., Tokyo, Japan; Ricoh Corporation, Menlo Park, Calif.

[21] Appl. No.: 222,281

[22] Filed: Apr. 1, 1994

[51] Int. Cl.⁶ .............................. G06F 15/40; G06F 15/62
[52] U.S. Cl. .......................... 395/600; 395/650; 395/145; 364/419.19
[58] Field of Search .................................. 395/600, 575; 382/10, 41

[56] References Cited

U.S. PATENT DOCUMENTS

| | | | |
|---|---|---|---|
| 4,646,352 | 2/1987 | Asai et al. | 382/5 |
| 4,696,046 | 9/1987 | Schiller | 382/5 |
| 4,775,956 | 10/1988 | Kaji et al. | 364/419.07 |
| 4,961,139 | 10/1990 | Hong et al. | 395/600 |
| 5,197,107 | 3/1993 | Katsuyama et al. | 382/30 |
| 5,267,332 | 11/1993 | Walch et al. | 382/55 |

OTHER PUBLICATIONS

Califano, Andrea, et al., "Multidimensional Indexing for Recognizing Visual Shapes", *IEEE Transactions on Pattern Analysis and Machine Intelligence*, vol. 16, No. 4, pp. 373–392, Apr. 1994.

Califano, Andrea, et al., "Multidimensional Indexing for Recognizing Visual Shapes", *Pro. IEEE Conf. Computer Vision and Pattern Recognition*, pp. 28–34, Jun. 1991.

*Primary Examiner*—Thomas G. Black
*Assistant Examiner*—Cuan Pham
*Attorney, Agent, or Firm*—Townsend and Townsend and Crew; Philip H. Albert

[57] ABSTRACT

An improved document matching and retrieval system is disclosed where an input document is matched against a database of documents, using a descriptor database which lists descriptors and points to a list of documents containing features from which the descriptor is derived document. The descriptors are selected to be invariant to distortions caused by digitizing the documents or differences between the input document and its match in the document database. An array of accumulators is used to accumulate votes for each document in the document database as the descriptor base is scanned, wherein a vote is added to an accumulator for a document if the document is on the list as having a descriptor which is also found in the input document. The document which accumulates the most votes is returned as the matching document, or the documents with more than a threshold number of votes are returned.

18 Claims, 5 Drawing Sheets

The Preisach Model for ferromagnets is generalized and adapted for the description of the hysteretic behaviour of a polycrystalline specimen of shape-memory alloys.

Fig. 4

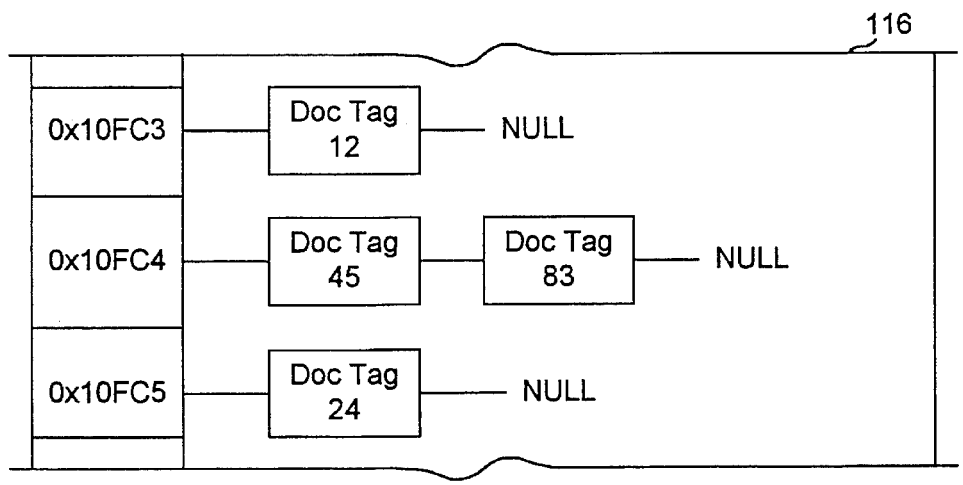
Fig. 5
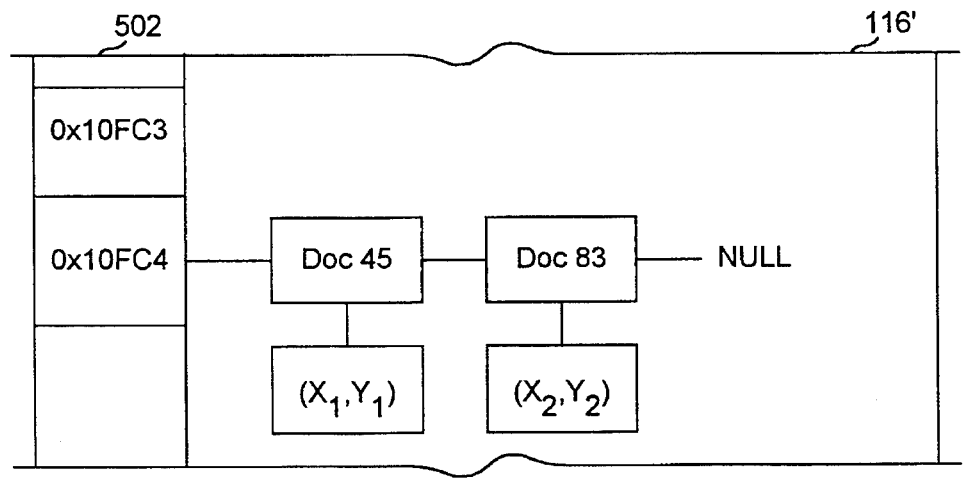
Fig. 6
| Doc Tag | Count | Position of Last Hit | 304' |
|---|---|---|---|
|  | 0 |  |  |
| 44 | 0 |  |  |
| 45 | 2 | $(X_1, Y_1)$ |  |
|  | 0 |  |  |
Fig. 7

IMAGE MATCHING AND RETRIEVAL BY MULTI-ACCESS REDUNDANT HASHING

BACKGROUND OF THE INVENTION

The present invention relates to the field of image processing and storage, and more specifically, to comparing an input document to a database of stored documents and finding documents matching the input document.

A document database is a collection of documents, digitally represented. Typically, these documents begin as paper documents which are then digitally captured on scanners or digital photocopiers, however they may also be non-paper documents, such as the output of a word processing program or a facsimile machine. For each document, which may contain multiple pages, and/or a portion of a page, a tag is provided to uniquely identify the document, such as a document number. A multi-page document might be considered to be multiple images, and a paper document might be considered distinct from the image present on the paper, however these distinctions are not relevant here, and the terms "document" and "image" are herein used interchangeably to mean an item, digitally represented and discretely identified, in a document database or an item input to a query engine for comparison to documents in the document database. The content of a document can be text, line art, photographic images, computer-generated images, or other information, or combinations of these types of content.

A document may be retrieved by querying the document database for a document number or other unique identifier assigned more or less independently of the contents of the document, but more useful is the ability to query the document database using some feature or features of the content of the document(s) sought. Also, the ability to test an input document against the documents in the database for matches is useful. For these abilities, an indexing system is required. These features, and the documents from the database which "have" these features are associated in an index, which is either generated ahead of time, or generated on the fly from a scan of all the documents in the database, with the former usually the preferred method.

Thus, a feature is used to locate an entry in an index, and that entry indicates the document(s) having that feature. This index is either stored in one place separate from the document database, or is distributed as additional data attached to each document. For example, suppose all the documents are stored merely as blocks of text (no images or formatting), such as a series of ASCII files. In this example, a feature might be a string comprising the first N words of the text block, a count of the number of times a specified character or word appears in the text block, or a count of the total number of characters in the text block.

This index allows for two types of queries, depending on the input to a query engine. In one type of query, feature inputs are provided, and in the other type, an input document having those features is provided. An example of the former is a query where a feature such as total character count is the query input, and the response to such a query is a list of documents having that number of total characters. With the second type of query, a document is input to the query engine and the response to the query is the documents in the document database which match the input document. Of course, where a set of feature inputs can be generated from an input document and an input document can be generated which has the features indicated by the feature inputs, either type of query can be used in either system.

One query that is of interest in the above example of a document database is a search for documents with a given passage of text. The objective of this query is to determine whether the given passage of text exists elsewhere in the document database. However, in some environments, the documents are stored as images not as text. In these cases, text image matching provides an important capability for a document database query system.

A text image matching system is useful in a legal office to locate previous revisions in a document database of a given input document even if edits have been made. Another example of the usefulness of text image matching is in a classified document copier, where sensitive materials are copied and digital images of copies made are retained in a document database. Given a classified document, it is sometimes necessary to determine whether a document was copied, when the document was copied and which other documents were copied at approximately the same time.

An obvious implementation of a document database in which an input image is matched to images in a document database is to apply optical character recognition (OCR) to each document in the document database and store the resulting text. To query the database, an input document is also converted to text using OCR, and the resulting text is matched against the text in the document database using known methods of text matching. However, this has the disadvantage that an OCR process must be applied to all the text in the database documents and the resulting ASCII data stored for subsequent searches. The OCR must also be tolerant to the range of image distortions that occur in practice. If the full image of the matched document is to be retrieved, the document database cannot merely consist of the ASCII data, but the ASCII data must be stored in addition to the text images. Furthermore, this method does not extend well to non-text images or images which combine text and graphics such that a search might look for a document by matching text and graphics. The above method is also not very tolerant to noise, such as where the document database comprises documents entered by scanning and OCR.

If storage space and processing power are at a premium, an alternative solution is a system which matches an input document image directly against the image data in the database. This bypasses the need for OCR and reduces the associated storage requirement. Any necessary invariance to image distortions are modeled directly at the image level.

Various solutions have been proposed for matching queries to database entries when both are images, but none have been found to be completely acceptable. For example, in a top-down structural search method, an image is reduced to a listing of the objects shown in the image and the spatial relationships between the objects. This listing is used as an iconic index for the image. An iconic index is generated and stored for each of the documents in the document database, and to perform a query, the iconic index for the input document is generated and compared to the stored iconic indices. For further discussion of this, see S. K. Chang, Q. Shi, and C. Yan, "Iconic Indexing by 2-D Strings", *IEEE Trans. on Pattern Analysis and Machine Intelligence*, Vol. PAMI-9, No. 3, May 1987.

Several versions of an iconic indexing system exist using what is known as two-dimensional strings. See, for example, C. C. Chang and S. Y. Lee, "Retrieval of Similar Pictures on Pictorial Databases", *Pattern Recognition* 24, 7 (1991) 675–80, and G. Costagliola, G. Tortora and T. Arndt, "A Unifying Approach to Iconic Indexing for 2-D and 3-D Scenes," *IEEE Transactions on Knowledge and Data Engi-* neering 4, 3 (June, 1992) 205–22.

In such a system, the geometric relationships between objects in the image are represented by strings. A query then uses a string matching algorithm to locate images in a database that match a query. However, the success of such a system relies on, among other things, accurate pattern recognition to determine correctly what objects are present in an image.

Hashing has been used to speed up matching in a two-dimensional string query system. With hashing, each image in a document database is represented in a document index by sets of ordered triples, and an input document of a query is represented by a set of ordered triples. Each triple contains the identity of two objects in the image and the spatial relation (one of nine direction codes) between them, and an index entry for that triple points to those database images in the document database which contain an instance of that triple. The images in the document database that match a query are determined by identifying those triples present in the input document, collecting lists of images for each triple and intersecting the lists. A query is satisfied if the intersection is not empty. While this top-down strategy is useful as a fast adaptation of the two-dimensional string approach, it is sensitive to errors in segmentation of an image into objects and pattern recognition used to identify those objects. In fact, a single error in either process (segmentation or recognition) may cause a query to fail. Unfortunately, it is precisely this sensitivity to noise that must be overcome to guarantee reliable performance.

A bottom-up, featural information approach has been used to overcome some of the disadvantages of the top-down method. In a technique known as geometric hashing, "interesting points" extracted from a query image are matched to interesting points extracted from images in a document database. "Interesting points" are defined as points located by an application-specific operator operating upon the image. For example, in an application where an aerial photograph is matched to a database of aerial photographs of known locations where the query aerial photograph might not exactly match its match in the database, the operator would locate small areas of high gray level variance. The assumption with this application is that different versions of the same image will yield the same interesting points even though the versions may differ due to distorted caused by noise. For further discussion of geometric hashing, see Y. Lamdan and H. J. Wolfson, "Geometric Hashing: A General and Efficient Model-Based Recognition Scheme", *Second International Conference on Computer Vision*, 1988, pp. 238–249.

In a bottom-up query, a query image and a queried image from the document database are compared to each other by comparing interesting points. To correct for translation, rotation, and scaling, the interesting points of both images are normalized before comparing, where the normalization is a transformation which transforms a selected pair of points to the unit points (0,0) and (1,0). Other distortions can be accounted for by using more than two points in the normalization. After normalization, the normalized interesting points from two images are matched to each other. The two images are "equivalent" if an acceptable number of points are in one-to-one correspondence after some pair of normalizations.

Hashing has also been used to speed up the bottom-up query process by pre-computing all the normalized interesting points of each database image. The normalized coordinates of each point as well as the identity of the image and the parameters of the transformation are stored in a hash table. A query image is tested against the document database by computing a normalized version from each pair of its points. The coordinates of all the normalized points are then used to access the hash table. As each database document's hash table entry is compared, votes are accumulated for database images that have points in the same normalization position as a normalized point in the query image. A match is deemed to occur between a query image and a database image if enough votes are accumulated for one of its normalized versions.

This bottom-up process effectively uses low-level featural information as a substitute for the high-level recognition results used by the top-down method. However, the use of only single isolated points (the "interesting" points) in the matching process ignores the contextual information available from surrounding points which provide information about the relative positions of pluralities of features. This leads to a brute-force algorithm with a run-time complexity $O(N^3)$ (i.e. on the order of $N^3$) for N interesting points in a query image, since each normalization might need to be tested.

From the above it is seen that an improved system for querying a document database with an input document is needed, where the documents in the database are allowed to include text and graphics, or where distortion and/or quantization noise are present in the documents in the database or the input document to preclude an exact character-by-character or pixel-by-pixel match.

SUMMARY OF THE INVENTION

An improved document matching and retrieval system is provided by virtue of the present invention.

The system holds documents in a document database, against which an input document is to be matched. A descriptor database is provided which lists descriptors, where a descriptor is derived from a feature of a document. An entry in the descriptor database represents a descriptor and points to a list of all the documents in the document database which include the feature associated with the descriptor. The descriptors are selected to be invariant to distortions in digitizing the documents and are redundant to accommodate noise in the digitization of the documents or differences in the input document and its match in the document database. An array of accumulators is used to accumulate votes for documents in the document database as the descriptor base is scanned, wherein a vote is added to an accumulator for a document if the document is on the list as having a descriptor which is also found in the input document. The document which accumulates the most votes is then returned as the matching document.

In one embodiment, the system is configured to return more than one document, such as all documents with more votes than a threshold. This embodiment is useful where documents include a large amount of noise, or where the input document is a subset or superset of more than one document in the document database.

To save storage space, the descriptors might be hashed, so that a hashed descriptor points to a list of documents which is the union of the lists of documents for all the descriptors which hash to that hashed descriptor. The space savings is provided by the reduction in the number of descriptors needing to be maintained.

But one benefit of the present invention is that the descriptors are redundant so that two documents which should match will match and two documents which should not match will not match, even in the presence of noise. Also, because of the redundancy, not all of the descriptors need be used. For example, in an embodiment where an estimated "quality", or accuracy, value is associated with each descriptor, only the higher quality, i.e., more accurate, descriptors are used.

In a specific embodiment, descriptors include sequences of consecutive word lengths and invariant relationships between graphic elements of a document. Features calculated from groups of consecutive words are used as descriptors for a passage of text. The identity of the passage from which each descriptor was extracted is stored in a hash table. When a query is done, descriptors are extracted from an input image and each are used to access the hash table and accumulate a vote for each of the database entries (documents) which contain the descriptor. A match is deemed to occur if a database document receives an acceptable number of votes. The "word-length" descriptors are extracted from a number of adjacent words and are invariant to changes in translation, rotation and scaling.

One benefit of embedding the distortion invariance of features directly in the descriptors rather than in the matching process results in an algorithm with an O(N) run-time complexity for N words in a query image, since a query descriptor need only be tested against a database descriptor once, not all the possible distortions of a feature. This is made possible by the fact that two equivalent images with different distortions (rotations, scales, translations) will not the less have the same number of descriptors and the descriptors will match (except to the extent the descriptors are altered by noise; redundant descriptors will improve the signal-to-noise ratio to reduce the effects of noise).

Descriptors provide distortion-invariant representations for local features in an image which are independent sources of information. By using a number of descriptors for each image, the inter-descriptor redundancy compensates for noise occurring in the feature calculation. Thus, even though a percentage of the descriptors extracted from a document may be incorrect, two equivalent documents will still have more descriptors in common than two different documents. Also, since descriptors are local, a document which is merely a subset, or clipping, of a larger document will receive a number of votes from matching descriptors in the portion clipped.

A further understanding of the nature and advantages of the inventions herein may be realized by reference to the remaining portions of the specification and the attached drawings.

BRIEF DESCRIPTION OF THE DRAWINGS

FIG. 4 is an illustration of an example query document input to a query engine for matching against a document database;

FIG. 5 is a detailed view of a portion of a descriptor database;

FIG. 6 is a detailed view of a portion of a descriptor database used with a fast convergence query; and FIG. 7 is a detailed view of a portion of an accumulator array used with the fast convergence query.

Three Appendices, A, B and C, follow the detailed description.

DESCRIPTION OF THE PREFERRED EMBODIMENTS

The detailed description describes a document storage system and a query system used to find matches between a query input (either a query document or a query feature set) and documents stored in the document storage system, using descriptors derived from the query input. Following this description is a description of how the descriptors are selected to provide good responses to queries and then how the descriptors are, in one embodiment, hashed to conserve processing power and storage space, and how a reduced number of descriptors is used in some embodiments to conserve space.

Following the discussion of the structure of the document storage, query and retrieval system, a specific example is described, including experimental results for that specific example.

Document Storage, Query and Retrieval System

Figure 1:
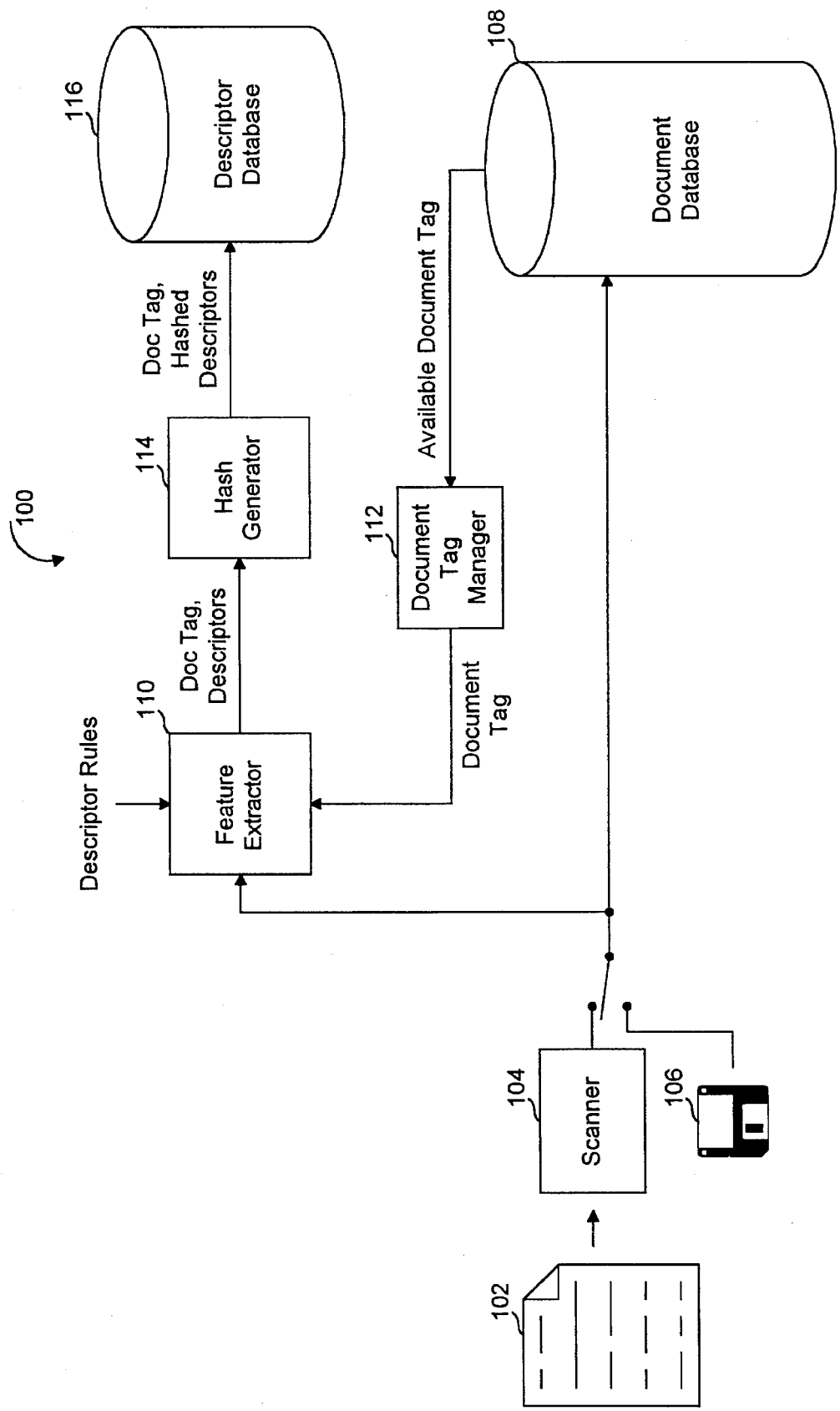
FIG. 1 is a block diagram of a document storage system in which digital representations of scanned paper documents and/or electronic documents are stored along with descriptor cross-references.

FIG. 1 is a block diagram of a document storage system 100 which is shown accepting a paper document 102 and an electronic document 106 for storage. Storage system 100 includes a scanner 104, a document database 108, a feature extractor 110, a document tag manager 112, a hash generator 114 and a descriptor database 116. Interconnections are provided so that scanner 104 provides digital representations of documents to document database 108 and to feature extractor 110. Document tag manager 112 is coupled to document database 108 and feature extractor 110 to scan document database 108 for available document tags (identifying numbers or other labels), to assign a document being accepted a document tag, and to provide that tag to feature extractor 110.

Feature extractor 110 is coupled to hash generator 114 to provide descriptors extracted from a document, along with that document's tag, to hash generator 114, which is in turn coupled to descriptor database 116 to provide hashed descriptors for the document to descriptor database 116 along with the document's tag. In some embodiments, where the operation of the feature extractor or the hash generator does not rely on the document's tag, the tag need not be supplied to those elements, but can be supplied to the descriptor database directly. Feature extractor 110 is shown in FIG. 1 being externally supplied with descriptor rules, which determine which features of a document are extracted and converted to descriptors. In alternate embodiments, the rules are fixed within the feature extractor.

In a document storage operation, a digital representation of a document is stored in document database 108 while the digital representation is passed to feature extractor 110. Feature extractor 110 produces descriptor elements from the digital representation. The descriptors are preferably invariant of translation, rotation, scaling, format, font and subdivision, so that a given descriptor which is extracted from a document would still be extracted, even if the document is scanned in a different orientation, is resized or otherwise distorted. For example, with a text document, a descriptor would not be dependent on the particular margin settings or fonts used in the document. An example of specific descriptors is given below.

Once the descriptors are extracted from the digital representation of the document, they are processed by hash generator 114 to condense the amount of storage needed for the descriptors. Particular examples of hash generators are given below. Hashing is particularly useful where a great many redundant descriptors are extracted for a document, which is often necessary to counteract the effects of noise in the digital representation.

Figure 2:
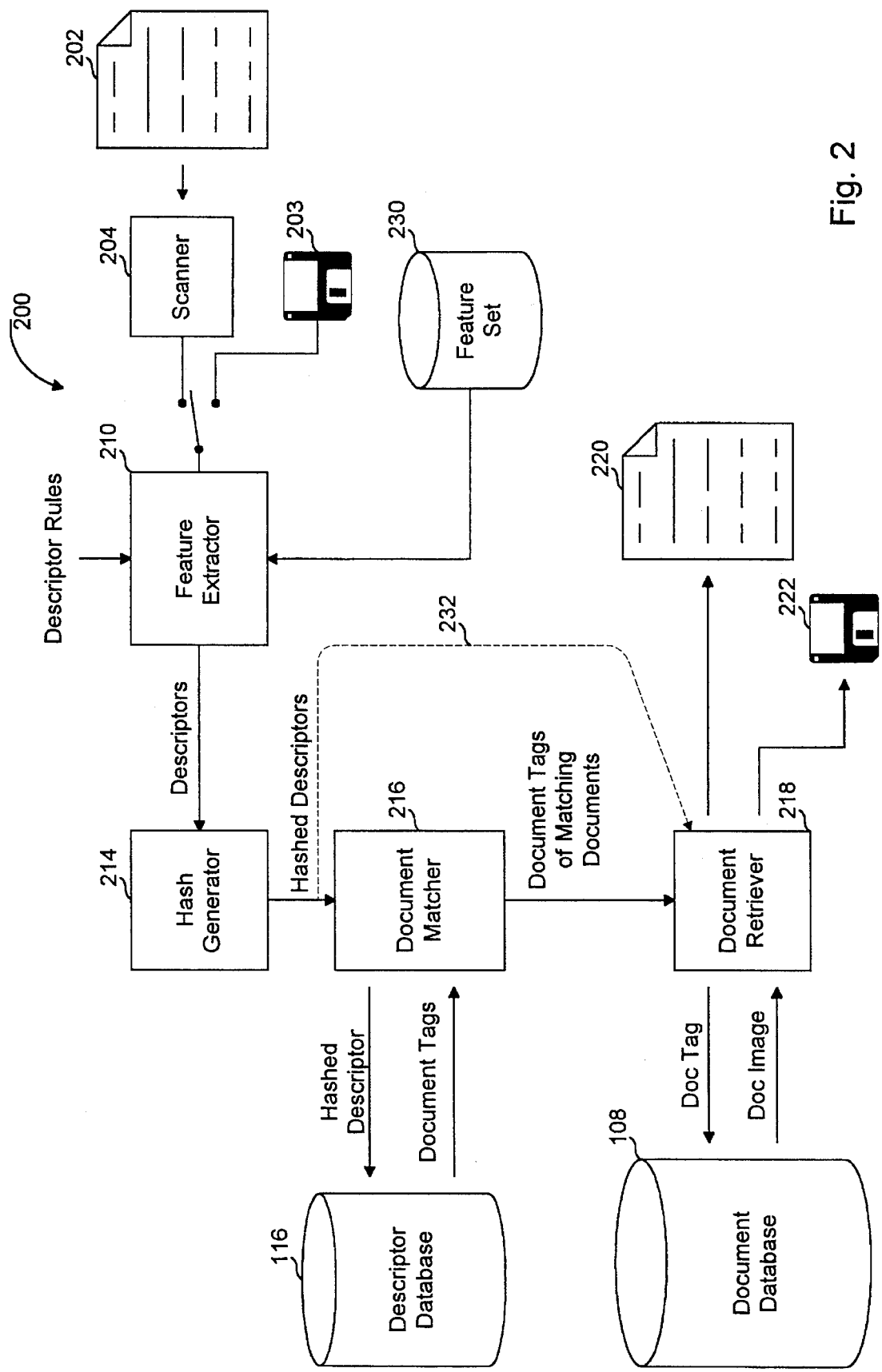
FIG. 2 is a block diagram of a query engine used to locate stored documents which match in whole or part with a query document or a query feature set.

FIG. 2 is a block diagram of a query engine 200 used to locate stored documents which match in whole or part with a query document or a query feature set. Query engine 200 accepts a paper document 202, an electronic document 203, or a feature set 230 as its query input, and using descriptor database 116 and document database 108, output a match document, which is either a paper representation 220 of a retrieved document or an electronic representation 222.

Query engine 200 includes a scanner 204, a feature extractor 210, a hash generator 214, a document matcher 216 and a document retriever 218. Scanner 204, feature extractor 210 and hash generator 214 are configured and interconnected similarly to scanner 104, feature extractor 110 and hash generator 214, and in the absence of noise, quantization or otherwise, the hashed descriptors output by hash generator 114 and hash generator 214 should be the same for the same document. The fact that, with noise, they might not be the same, and yet the hashed descriptors will still match documents is one of the benefits of the present invention.

One difference in the connection of feature extractors and hash generators is that hash generator 214 also accepts a feature set 230 from which descriptors are derived. As an example, if a document to be queried has features such as a specific text phrase or a set of objects displayed in a certain arrangement, and these features generated descriptors according to the descriptor rules, then just those features might be input, instead of needing a document with those features. However, it would probably be more common to submit an actual document for matching.

An output of hash generator 214 is coupled to document matcher 216 and optionally via a path 232 to document retriever 218. Document matcher 216 is also coupled to document retriever to provide indications of matching documents. In some embodiments, the feedback system which uses the hashed descriptors is not included or is included in document matcher 216. In either of the latter cases, path 232 is not needed. The feedback provided by path 232 can either be a manual system, where multiple match candidates are presented to a user for selection, or and more selective automatic matching process among the candidates, such as that described below as the "Contextual" method.

Document matcher 216 is coupled to descriptor database 116 to address it and retrieve descriptor records and linked lists of document tags therefrom, and document retriever 218 is coupled to document database 108 to address it and retrieve document images, or portions, therefrom.

To perform a query, a query input in the form of a paper or electronic document, or a feature set, are input to feature extractor 210, using scanner 204 if the query input is a paper document. Feature extractor 210, using the provided descriptor rules, derives descriptors from the query input and outputs the descriptors to hash generator 214. If hash generator 114 is not used, hash generator 214 is also not used. If the descriptor rules require feature extractor 210 to use text characters present in the query input and the input is not already in text form, feature extractor 210 would include an OCR subsystem to convert portions of the query input to text.

Once the descriptors are output by the feature extractor, they are hashed into hashed descriptors by hash generator 214, and passed to document matcher 216, which retrieves records for each of the hashed descriptors from descriptor database 116. Each of these records includes a list of documents which, when processed, resulted in that hashed descriptor. Thus, if the query document is found in the document database, one or more of these lists so retrieved would include the document tag of the stored document matching the query input, along with many other documents of course.

Figure 3:
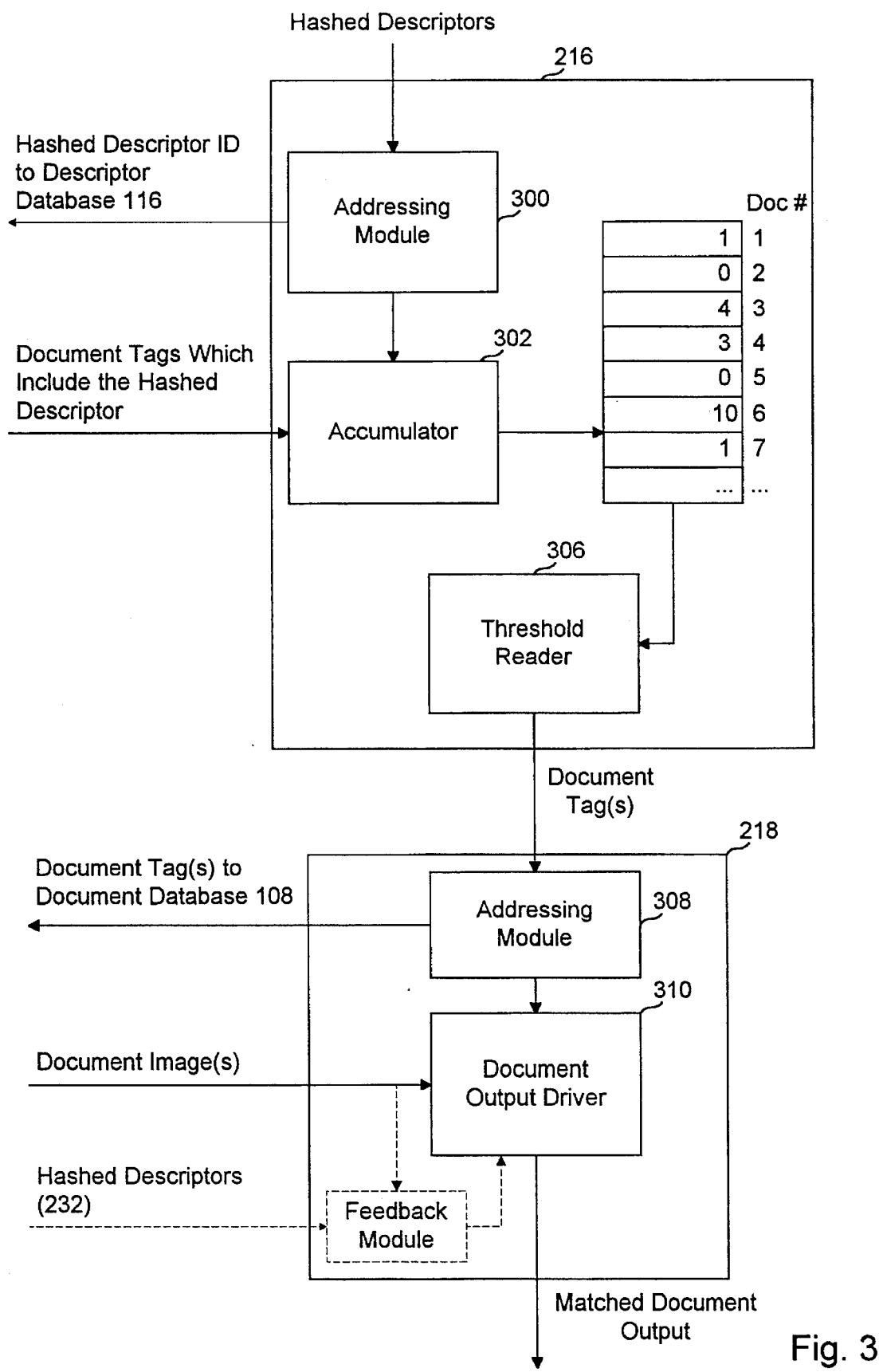
FIG. 3 is a block diagram showing a document matcher and a document retriever from FIG. 2 in greater detail.

As shown in more detail in FIG. 3, document matcher 216 accumulates votes for documents by counting one vote (or weighted votes in an alternative embodiment) for each time that document's tag appears on a list associated with a hashed descriptor. The match is then output to document retriever 218.

In one embodiment, the tag of the document with the most votes is output, while in another embodiment, the tags of all documents with more than a threshold number of votes are output. With this plurality of document tags, document retriever 218 retrieves the one document or plurality of documents indicated by document matcher 216, and if more than one document is retrieved, either make a further selection among the documents using the hashed descriptors provided on path 232 and outputs the selected document, or outputs all the retrieved documents.

FIG. 3 is a block diagram showing document matcher 216 and document retriever 218 in greater detail.

Document marcher 216 is shown with an addressing module 300 coupled to the input of document matcher 216 which receives hashed descriptors and coupled to an output of document matcher 216 which addresses descriptor records in descriptor database 116, an accumulator 302 coupled to receive document tags from descriptor database 116 and coupled to an accumulator array 304. A threshold reader 306 is coupled to accumulator array 304 and the document tag output of document matcher 216.

Document retriever 218 is shown with another addressing module 308 coupled to the input of document retriever 218, a document output driver 310 and, in some embodiments, a feedback module 312. Addressing module 308 receives a document tag or document tags and uses the tag to address document database 108. The addressed document images are provided to document output driver 310, and if used, to feedback module 312. If used, feedback module 312 examines the contents of the plurality of documents retrieved and filters out documents based on their contents and the hashed descriptors formed for the query.

The operation of the apparatus shown in FIG. 3 to output matched documents based on hashed descriptors will now be described. The hashed descriptors are provided to addressing module 300 of document matcher 216, which uses them to address descriptor database 116. Descriptor database 116 returns the document tags of the documents addressed by address module 300, i.e., the document tags from each of the lists of document tags associated with the hashed descriptors.

Accumulator 302 accumulates a count for each of the document tags encountered into accumulator array 304, with one count added to a document tag's count each time the document tag is returned by descriptor database 116. In one alternate embodiment, the count is a weighted value where more reliable descriptors are given greater weight. Once the counts are accumulated, threshold reader 306 outputs the document tags which have the most accumulated counts. In one embodiment, only the document tag with the most counts is output, whereas in other embodiments the document tags with counts over a threshold amount are output.

The document tags output by threshold reader 306 are input to addressing module 308, which applies the document tag or tags as an address or addresses to document database 108. Document database 108 returns the addressed document images to document output driver 310. Depending on the needs of document output driver 310, document database 108 can be configured to return less than all of the document image. For example, in some systems, the first page of multi-page documents, or a thumbnail representation of an image is all that is needed. Document output driver 310 then outputs the documents, or portions thereof, retrieved by document database 108. IF feedback module 312 is used, the content of the documents are read and further selections of the documents are made based on the hashed descriptors. This allows for a quick, wide search to be done and further narrowed based on the documents themselves, which is useful where it is especially important not to miss a document in a search.

As described above, documents are converted to digital representations, including but not limited to ASCII text, formatting codes, graphic bit maps or object representations of graphics and/or text, and stored in a document database. Along with the digital representation, hashed descriptors are extracted from the document's content and a cross reference of which documents yielded which hashed descriptors is maintained. In a query, a document or feature set is processed to generate hashed descriptors from its content. From these hashed descriptors, the query system reviews the cross reference to determine how many hashed descriptors the query input has in common with various documents stored in the document database. The document with the most hashed descriptors is returned, or in some embodiments, all documents with more than a threshold number of hashed descriptors in common are returned.

Selection of Descriptor Rules

The descriptors provide a distortion-invariant representation for local features in an image, and therefore a descriptor is an independent source of information. By using a number of descriptors for each image, the inter-descriptor redundancy can compensate for any noise which may occur in the ditigization and feature extraction process. With redundant descriptors, even though a percentage of the descriptors extracted from a document may be incorrect, there should still be more descriptors in common between two equivalent. documents than between two different documents.

The use of distortion-invariant descriptors requires that the feature extraction stage be specialized for this requirement. In other words, the feature extraction stage is dependent on the type of content of the image. For example, in text images, word length pattern is a good descriptor. A word length pattern is an ordered list of the lengths of consecutive words. While this is not a function of the rotation, translation, or scale of a document, and degrades gracefully in the presence of noise, it must be known in advance that the document contains text, and the direction the text reads must be determined. Fortunately, these requirements are easily met by OCR processes. If the word length patterns are long enough to overlap each other, then the descriptors will be redundant to some degree. The preprocessing to determine content type and word orientation results in a simpler matching algorithm than previous methods that postponed the correction for geometric distortion until after the descriptors had been calculated. as detailed in the previously cited references.

The use of variable-size groups of local features as descriptors for an image provides a method for tuning the amount of contextual information that is utilized. For example, increasing the number of words used to form each word length pattern descriptor increases the number of possible descriptors. This improves performance by decreasing the number of descriptors that will occur by chance in a text passage that does not match a query. However, this improved performance comes at the expense of an increased storage requirement for the descriptor database, which needs to contain one entry for each possible descriptor.

Hashing Generator

An example of hashing generator 214 will now be described. The operation of hashing generator 214 is best described by its "hash function" which maps a descriptor to a hashed descriptor. In a typical hashing operation each descriptor maps to a single hashed descriptor, i.e., it is a function, and there are fewer hashed descriptors than descriptors. The primary concerns in the choice of hash function are to ensure a high rate of dispersion by the hash function and to minimize the storage required for the data structures. High dispersion is that which results in a set of typical descriptors distributing fairly evenly over the hashed descriptors, a result of which is often referred to as having a low collision rate. The storage required for the hash function, often referred to as the "hash table", and the linked lists associated with the hash table entries should be minimized.

In one embodiment, the hash function returns an integer address in the range [O . . . N–1] for a descriptor, where N is typically a large prime number. One implementation uses the descriptor as a seed to a pseudo-random number generator. In the example presented in detail below, where descriptors describe word length patterns, the descriptor is a 32-bit representation of the word length pattern and the hashed descriptor for that descriptor is the modulo-N remainder of the 32-bit value.

Descriptor database 116 is organized as an array with N entries, one for each hashed descriptor. Each entry points to a linked list of document tags or passage identifiers, where a passage identifier might identify a subset of a document. In most cases, passage identifiers are interchangeable with document tags. However, it depends on the content of the stored documents and whether it is sensible to retrieve or search less than all of a document.

In an alternate embodiment, the linked list is ordered by the value for the original descriptor, so that descriptor database 116 can return just the document tags for the original descriptor instead of the document tags for all the descriptors which hash to the one hash descriptor provided as the database address by address module 300. In this embodiment, of course, hash generators 114 and 214 pass the original descriptors through to their output along with the hashed descriptor. In the example application discussed in detail below, because of the redundancy between descriptors, a collision resolution scheme was deemed unnecessary.

Instead, document tags are stored at the database entry for the hashed descriptor which results from hashing the original descriptor.

With a clever arrangement of the descriptor database, available memory can be allocated almost entirely to the linked lists, since the hashed descriptor need not be stored if it is just the physical memory location of the start of the table. Furthermore, if the linked lists are in sequential memory locations, then only an indication of the end of a linked list is needed. The number of linked list entries is the number of descriptors for a document, summed over all documents.

The memory requirements of the accumulator array 304 is also determined by the number of documents and the number of descriptors per document, since array 304 should have one entry for each document, so that votes can accumulate for that document, and each entry should be wide enough to hold the largest accumulated count. In the absence of noise or descriptor weighting, the maximum number of counts is the number of descriptors taken from each document. Even in the presence of noise, the number of counts will usually be limited to the number of descriptors in the query document, which will be used in the case where one document tag is present in all the linked lists of descriptors found in a query document.

Reduced Number of Descriptors

Since the number of descriptors taken from a document determines, in large part, the storage requirements, reducing the number of descriptors taken from a document will reduce storage costs. However, this should be done without affecting the matching performance. A reduction in the number of descriptors taken, without a performance reduction, is possible if descriptors are chosen which discriminate one passage from another and can be calculated reliably in the presence of noise. There are several methods for choosing a subset of descriptors for a given passage.

In one embodiment, a descriptor is given a weighting value indicating how likely the descriptor discriminates between two passages, which is called a descriptor's discrimination ability. The descriptors which have a low discrimination ability are not used. This lowers the number of descriptors taken per document, and therefore the number of times that document's tag must appear on a linked list in the descriptor database.

A potential difficulty with this method for choosing descriptors is that it ignores information that may be available about the reliability with which a given descriptor may be calculated. A solution is to use the probability that a descriptor is correct as the criterion for choosing the descriptors that are retained, or a weight which is a combination of the discrimination and the reliability. The reliability is estimated from the product of the probabilities that each of its components is correct. For example, where a descriptor represents feature descriptions such as the number of letters in S adjacent words, the probability that the descriptor is correct is the product of the probability that the feature description for each of the words, i.e., the letter count, is correct. This information can be obtained empirically or by comparing the output of the feature extractor with another known accurate means of extracting features. For example, where the documents to be stored are scanned paper documents of a known range of qualities, a set of electronic documents can be printed to the known range of qualities, scanned and then their features extracted and compared with features extracted from the electronic originals.

Analysis

The tolerance of the feature extractor to noise is an important consideration. In the above example, if the probability of correctly determining the feature description for a word is p, then the probability of correctly determining the feature description for S consecutive words is $p^s$. For example, with p=0.90, and S=5, $p^s$=0.59. Thus, 59% of the descriptors extracted from a given passage will be correct under these conditions. All 59% of them will occur in the correct matching passage. Some of these descriptors will also occur in other passages in the database; these are false positives.

The other 41% of the descriptors, which are incorrect, will be distributed over the other $K^s$ descriptors, where K is the a maximum word length. Some of those errors will be "detectable" because they occur in no other passages in the database, and therefore are obviously errors. Those obvious errors will not result in counts being applied to accumulator array 304, since they are associated with no documents and therefore have empty linked lists of document tags. Other errors will be undetectable, because they occur in other documents, and will result in counts accumulating to documents other than the correct document.

The detectable error descriptors are of no concern since they result in incrementing no counters. Error descriptors that increment counters associated with the correct passage are usually not detectable and are of no concern. However, undetectable errors as well as false positives that increment counters for other passages could lead to errors in the final decision or an inability to reach a decision if the errors are too numerous.

The number of error descriptors generated depends on the a-priori probability of the descriptors occurring in the passage, the value of p, and the value of S. Sequences with a high a-priori probability are more likely to be transformed by the occurrence of an error into other descriptors with high a-priori probabilities since only small differences in word length are likely to occur in practice. This makes modeling the occurrence of errors with a uniform distribution difficult.

The probability that a feature description is determined correctly (p) is influenced by the quality of the original image. The objective in designing the feature extractor for this task is to obtain a value for p that is as high as possible.

The choice of S provides the most direct control over the number of detectable and undetectable errors, as well as the number of false positives generated. Increasing S increases the number of detectable errors since an error is more likely to result in a descriptor that does not point to any documents in the descriptor database. This is because of the exponential increase in the number of possible descriptors that occurs as S is increased. The number of undetectable errors and false positives are decreased for the same reason. However, increasing S increases the overall number of descriptors generated for a database of text passages and increases the storage needed for the lists of passage identifiers.

Thus, a value for S should be chosen such that $p^s \times$(# of descriptors taken per document) is significantly greater than the most undetectable errors and false positives that will occur in any passage. The storage cost incurred for increases in S are mediated by retaining a fixed number of descriptors per passage instead of all possible descriptors. This will provide a predictable linear increase in storage as passages are added to the database. Performance is improved even more if the descriptors removed from the hash table are those that result in undetectable errors or false positives.

Example Implementation

An example is now presented which demonstrates various aspects of the present invention, making reference to the apparatus shown in FIGS. 1–3. In this example, the document images comprise text. Two documents were supplied to scanner 104 (see FIG. 1) and were subsequently stored in document database 108. Each document is a sentence taken from a different page from the English Document Image Database I, from I. T. Phillips, S Chen and R. M. Haralick, "CD-ROM document database standard," *Proceedings of the Second International Conference on Document Analysis and Recognition*, Tsukuba Science City, Japan, Oct. 20–22, 1993, p. 478–483; document 0 is from sample A001 and document 2 is from sample A003. The text of these documents is as follows:

Document 0:
The Preisach Model for ferromagnets is generalized and adapted for the description of the hysteretic behaviour of a polycrystalline specimen of shape-memory alloys.

Document 1:
We hope that this work is a step toward understanding how people generate language as rapidly as they do and building practical language-generation systems that achieve similarly impressive speeds.

Feature extractor 110 used the following descriptor rule: A descriptor is a quintuple of values for word lengths of consecutive words. Values were limited to 15 (i.e., a 17-character word results in a value of 15), so that a word length fits in 4 bits of memory. Each descriptor is then representable by a 20-bit integer, which is passed to hash generator 114 with a document tag indicating from which document the descriptor came. Hash generators 114, 214 output a modulo-23 remainder of their input. More specifically, 3-8-5-3-12 is a descriptor for document 0 (the lengths of the first five words). Taken in reverse order, this descriptor has a 20-bit value of 0xC3583 (0x indicates hexadecimal radii), which is 800,131 decimal. This number is (23 * 34,788)+7, so hash generator 114 outputs a hashed descriptor with a value of 7 for this descriptor.

In this example, there are obviously 23 possible values for a hashed descriptor, so there are 23 entries in descriptor database 116. The descriptors and the resulting hashed descriptors for the two documents are shown in Table 1, with descriptors on the left separated from hashed descriptors on the right.

TABLE 1

Descriptors and Hashed Descriptors

Document 0:

| | | |
|---|---|---|
| 03-08-05-03-12=07 | 08-05-03-12-02=01 | 05-03-12-02-11=08 |
| 03-12-02-11-03=20 | 12-02-11-03-07=08 | 02-11-03-07-03=21 |
| 11-03-07-03-03=21 | 03-07-03-03-11=22 | 07-03-03-11-02=12 |
| 03-03-11-02-03=00 | 03-11-02-03-10=05 | 11-02-03-10-09=15 |
| 02-03-10-09-02=01 | 03-10-09-02-01=19 | 10-09-02-01-15=21 |
| 09-02-01-15-08=08 | 02-01-15-08-02=05 | 01-15-08-02-05=15 |
| 15-08-02-05-06=06 | 08-02-05-06-06=06 | |

Document 1:

| | | |
|---|---|---|
| 02-04-04-04-04=07 | 04-04-04-04-02=14 | 04-04-04-02-01=01 |
| 04-04-02-01-04=20 | 04-02-01-04-06=09 | 02-01-04-06-13=21 |
| 01-04-06-13-03=21 | 04-06-13-03-06=15 | 06-13-03-06-08=08 |
| 13-03-06-08-08=06 | 03-06-08-08-02=19 | 06-08-08-02-07=18 |

TABLE 1-continued

Descriptors and Hashed Descriptors

| | | |
|---|---|---|
| 08-08-02-07-02=13 | 08-02-07-02-04=09 | 02-07-02-04-02=08 |
| 07-02-04-02-03=13 | 02-04-02-03-08=12 | 04-02-03-08-09=04 |
| 02-03-08-09-15=20 | 03-08-09-15-07=21 | 08-09-15-07-04=17 |
| 09-15-07-04-07=19 | 15-07-04-07-09=04 | 07-04-07-09-10=16 |
| 04-07-09-10-06=10 | | |

A total of 45 descriptors were taken from the two documents and applied to hash generator 114, which in turn output hashed descriptors to descriptor database 116. The contents of descriptor database 116 after this operation is shown in Table 2.

TABLE 2

Descriptor Database 116 Contents hash[ 0] = 0
hash[ 1] = 0:1
hash[ 2] = NULL
hash[ 3] = NULL
hash[ 4] = 1
hash[ 5] = 0
hash[ 6] = 0:1
hash[ 7] = 0:1
hash[ 8] = 0:1
hash[ 9] = 1
hash[10] = 1
hash[11] = NULL
hash[12] = 0:1
hash[13] = 1
hash[14] = 1
hash[15] = 0:1
hash[16] = 1
hash[17] = 1
hash[18] = 1
hash[19] = 0:1
hash[20] = 0:1
hash[21] = 0:1
hash[22] = 0

Table 2 shows the 23 entries of database 116 along with the linked lists of documents associated with each hashed descriptor. The document tags in the linked lists, if more than one, are separated with colons, and null lists are indicated by the word "NULL". Forty-five descriptors input to hash generator 114, resulting in the use of 20 of the 23 hash table addresses with nine collisions that resulted in more than one document tag being stored for a single hashed descriptor.

Once document database 108 and descriptor database 116 are populated, a query can be processed against them. An apparatus for performing this process is shown in FIG. 2. In this example, input document 400, shown in FIG. 4, is the query which is used as the input 202 to scanner 204.

Scanner 204 converts the input document 400 to text as best it can. The number of characters in each word were estimated by a procedure that counted the number of connected components, thus an error is expected where the "n" in "ferromagnets" is garbled by noise. The output of scanner 204 is presented to feature extractor 210, which uses the descriptor rules to form descriptors. The descriptor rules indicate that a descriptor should be taken for each unique set of five consecutive words, and each of those descriptors describe the lengths of the five words in the set associated with that descriptor. In this example, due to the noise, feature extractor 210 mis-estimated the number of letters in "ferromagnets" as 15 instead of 12 because of several broken characters. Thus, the descriptors output by feature extractor 210 are as shown in Table 3.

TABLE 3

Descriptors and Hashed Descriptors for Query 400 Query Document:

| | | |
|---|---|---|
| 03-08-05-03-15=11 | 08-05-03-15-02=07 | 05-03-15-02-11=17 |
| 03-15-02-11-03=22 | 15-02-11-03-07=11 | 02-11-03-07-03=21 |
| 11-03-07-03-03=21 | 03-07-03-03-11=22 | 07-03-03-11-02=12 |
| 03-03-11-02-03=00 | 03-11-02-03-10=05 | 11-02-03-10-09=15 |
| 02-03-10-09-02=01 | 03-10-09-02-01=19 | 10-09-02-01-15=21 |
| 09-02-01-15-08=08 | 02-01-15-08-02=05 | 01-15-08-02-05=15 |
| 15-08-02-05-06=06 | 08-02-05-06-06=06 | |

The error results in five incorrect descriptors (the first five). Hash generator 214 hashes these descriptors to the values shown in Table 3 and provides the hashed descriptors to document matcher 216. Document matcher 216 retrieves the linked lists from descriptor database 116 (see Table 2) corresponding to the hashed descriptors provided, and accumulates the counts into accumulator array 304 (see FIG. 3). The contents of accumulator array 304 for this example are shown in Table 4.

$accum[0]=17$ $accum[1]=13$

Table 4. Contents of accumulator array 304

The value for accum[1] is not zero, because some of the hashed descriptors (1, 6, 7, 8, 12, 15, 19, 20 and 21) point to more than one document. Although it is not the case for this example, the errors might also have added to the accum[1] count, if the erroneous hashed descriptors pointed to linked lists which contain more instances of document 1 than the correct hashed descriptor. Even in the presence of noise and without hash collision handling, the descriptors clearly distinguish that the query document matches document 0 in document database 108 more closely than document 1. Significantly, this is done without reference to the location or orientation of the text in either document 0 or the query document 400. In fact, this query also works with a change of fonts.

The accumulator values shown in Table 4 indicate seventeen votes for document 0 and thirteen votes for document 1. Of the twenty hashed descriptors, five have linked lists which contain only a tag for document 0 (correct counts), twelve have linked lists which contain document tags for both document 0 and document 1 (false positives), and two have null linked lists (detectable errors). With empty lists, the errors are detectable if the query document is known to be fully represented in one or more documents in the document database.

Reducing the number of descriptors stored in descriptor database 116 by eliminating those that point to more than one document leaves 11 hashed descriptors and their linked lists (three that point to document 0 and eight that point to document 1). With the reduced number, the accumulated votes are five votes for document 0 and one vote for document 1, since only the hashed descriptors found in descriptor database 116 are counted. Thus, the matching performance is improved with a reduced number of descriptors. Additionally, less storage is needed for the descriptor database.

Experimental Results

Experiments were conducted to investigate several aspects of the text image matching system described above. Three potential implementation scenarios were investigated. One was an application where both the query and the database documents were not corrupted by noise (the "clean-clean" scenario), which models a system where the query is a clean ASCII data file (shown by floppy 203 in FIG. 2) queried against a document database derived from clean ASCII data such as computer files in a large computer file base. The second scenario is the "dirty-clean" scenario, where the query includes noise, but the document database does not, thus modelling an application where an image of a document is input and the original ASCII data from which that document was generated is available. The third scenario, "dirty-dirty", is where both the query and the database are noisy and possibly corrupted. This is a good model for an application where both the queries and the database are generated by two independent image processing systems.

The number of descriptors extracted from an input document that were matched against the descriptor database 116 were varied, to demonstrate that reliable performance is obtainable with descriptors that are generated from a limited portion of a document. This is an important consideration since the run time for the matching operation is expected to be largely determined by the image processing operations needed to estimate the number of characters in a word.

An additional set of experiments investigated the usefulness of the frequency-weighted and probabilistic methods for choosing subsets of descriptors for entry into the descriptor database. These experiments matched corrupted queries to a database generated from corrupted text. Reliable performance in these experiments is important since the storage needed for the descriptor database is determined mostly by the number of document tags stored in the linked lists, which should equal the sum of the descriptors taken and stored from each document in the document database.

In the experiment, a database of page images was used to generate queries that were matched against a document database which was collected from 17 articles in 14 different journals. For this experiment, each page image was treated as a separate document in the document database. Appendix A is a list of the articles from which the page images were derived. The page images were scanned at 300 dpi in binary mode (i.e., with a bi-level digitization).

The words on each page were located automatically and the identity of each word was manually entered by a human operator. Errors in word location from the image were not corrected. Thus, some images may contain only a portion of a word or more than one word. This was done to provide test data that reflected the performance of a document segmentation process.

The articles averaged seven pages each, providing 115 page images. Overall, the 115 page images included 65,565 individual word images, for an average of 570 words per page image. The original ASCII documents contained 64,475 words. Thus, the word location process had approximately a 1.7 percent error rate. An additional 882 document pages (ASCII text) from the University of Washington (UW) English Document Image Database were added to the document database. See Phillips, Chen and Haralick, cited above. These document pages included pages that contained at least one zone classified as "body text." The ASCII data was pre-processed to eliminate line breaks, and words split across lines were joined and the intermediate hyphens removed. This was done to approximate the appearance of the ASCII data before it was formatted. Thus, the total number of documents in the document database is 115 and 882, or 997.

The descriptors describe the number of characters in a set number of adjacent words. In separate test runs, this number was set to four, five and six. In the feature extractor (this could also be done in part by the scanner), a page image was divided into word images, and the number of characters in each word image was estimated by isolating and counting the number of connected components contained in the word image. Small components containing fewer than a fixed number of pixels above and at the end of words were not considered. This removed most of the common punctuation marks such as periods, commas, and so on.

The results of word length calculation are shown in Table 5. For each of the 17 articles, Table 5 shows the actual number of words in the article, the number of words as determined by the above word image examination process, and the percentage of the words in the image data whose length was estimated correctly. The article numbers refer to the database entries listed in Appendix A.

TABLE 5

| Article | Actual Count | Estimated Count | % of Lengths Correctly Counted |
|---|---|---|---|
| 1 | 3461 | 3688 | 89% |
| 2 | 4403 | 4412 | 98% |
| 3 | 4254 | 4386 | 98% |
| 4 | 4286 | 4280 | 95% |
| 5 | 2778 | 2809 | 93% |
| 6 | 3421 | 3500 | 90% |
| 7 | 3069 | 3155 | 97% |
| 8 | 3097 | 3182 | 94% |
| 9 | 6658 | 6791 | 93% |
| 10 | 4718 | 4839 | 95% |
| 11 | 1066 | 1050 | 93% |
| 12 | 4773 | 4716 | 92% |
| 13 | 3404 | 3405 | 96% |
| 14 | 5500 | 5532 | 91% |
| 15 | 4236 | 4312 | 93% |
| 16 | 2372 | 2450 | 93% |
| 17 | 2979 | 3058 | 96% |

The descriptors used to generate the "dirty" version of the descriptor database, or dirty input document descriptors, were computed using a noise model which simulates imperfections in the word length calculation. The sequence of word lengths, from a passage of text were input to a uniform random number generator which chose for distortion a fixed percentage, p, of them (for example, p=10%). Those chosen word lengths were then corrupted by adding a random deviate from a N(0,1) distribution. This distortion is added in the feature extractor, which distorts the descriptors it outputs, thus causing the hashed descriptors to be similarly distorted.

The clean-clean scenario corresponds to matching descriptors from the original ASCII document to the same descriptors stored in the descriptor database. In this scenario, all the descriptors from the query document should include a tag for the correct document on their linked lists. It is of interest to determine how many descriptors will also contain a tag for the next most frequently voted-for document (false positives), since this indicates the reliability of a threshold.

The noisy-clean case corresponds to matching descriptors computed from the test images to clean descriptors extracted from the ASCII documents. The number of descriptors which have a tag for the correct document in their linked lists should decrease by a percentage proportional to one minus the accuracy of the word length (which is one minus the error rate) raised to the power S, i e , $(1-(1-p)^s)$ where p is the error probability for one word length and S is the number of word lengths in each descriptor. The number of descriptors which contain a tag for the next-best document in their linked lists should remain about the same as in the clean-clean case. This is because the linked list entries for the distorted input descriptors should be randomly distributed across the other documents in the database.

The noisy-noisy case corresponds to matching descriptors from the test images to descriptors from the ASCII documents that had been corrupted by the noise simulation described above. The number of descriptors from the input document which have a tag for the correct document on their linked lists is expected to be $(1-p)^s * (1-p)^s$, since the input descriptors and database descriptors are generated by independent sources, each causing errors with a probability of $1-(1-p)^s$. The closeness of this value to the number of votes received by the next best choice is of concern.

The descriptor databases (clean and noisy) for this experiment were generated from the clean and noisy descriptors for the 997 ASCII database documents described above. In these experiments, the total number of document tags in all the linked lists was 100,003. Although quite often different descriptors resulted the same hashed descriptor, these hash collisions were not resolved. That is, no distinction was maintained between two different descriptors which hashed to the same hashed descriptor. Altogether, six different descriptor databases were generated using three word sequence lengths (4, 5 and 6) and two conditions on the document data (clean and noisy).

The number of descriptors taken from the input documents to be matched to the descriptor databases by the document matcher was varied from all descriptors (570 on average) to 50, 25 and 10 descriptors. When fewer than all descriptors were used, the first N (N=50, 25 or 10) that occurred were used to accumulate votes, and the rest were discarded.

In a real application, there would be no descriptors to discard, since the remainder of the document would not need to be processed that far. Thus, a performance improvement could be expected of anywhere from ten to fifty times faster image processing.

In this experiment, a query was run, and the contents of the accumulator array was examined. The results are shown in Appendix B. The five documents which received the most votes were recorded, as well as an indication of which, if any, of the recorded documents were in fact the same as the input document. In Appendix B, the number of votes received by a document is expressed as the percentage of input descriptors it contained. Thus, where an input document is a subset of a much larger document, the larger document will be an entry in the linked lists of every descriptor extracted from the input document (in the absence of noise). The percentages shown are averaged across the 115 test documents.

In each of the four tables, the first column shows the percentage of the query test runs where the correct document received the most votes, the second column shows the percentage of the query test runs where the correct document was one of the top five vote getters, the third column shows the average percentage of the input descriptors which included the top vote getter in their linked lists, and the fourth column shows the average percentage of the input descriptors which included the second highest vote getter in their linked list.

The results show that perfect performance is obtained in every case where all the sequences in the test document were matched against the database (N≈570). In other words, the top vote getter was the correct document in every case. The number of descriptors from the input which include the correct document in their linked lists behaves almost exactly as predicted assuming that the word length calculation was about 90 percent correct on average. Also, the difference between the percent of votes received by the first and second best choices was dramatic enough to make a fixed threshold adequate.

When fewer than all the input descriptors are matched against the descriptor database, perfect performance (top choice always correct) was obtained in the clean-clean condition. This is especially encouraging for applications such as content-based addressing of ASCII files since it says a unique "signature" may be derived from as few as ten sequential words. Of course, the number of words needed to derive such a signature increases as the number of documents in the database increases.

The results obtained when fewer than all the input descriptors are used (N=50, 25 or 10) and those descriptors are corrupted show that reasonable performance (correct document is in the top five vote getters about 90 percent of the time) is obtained with as few as 25 descriptors taken per document. This is significant for an application in which a user is allowed to manually select the correct document from among a limited number of choices formed from the top vote getters.

Storing fewer than the maximum number of descriptors from a document in the descriptor database is a way to reduce the storage cost for the data structure (this is an equivalent way of saying that a tag for the document is stored in linked lists of less than all the descriptors found in that document. The two methods proposed above chose the descriptors for a document or passage based on the descriptor's frequency of occurrence in the rest of the database (i.e., the length of its linked list) or based on the descriptor's expected probability of correctness. These techniques are referred to as the frequency weighting method and the probabilistic choice method, respectively.

Both methods were implemented and their effect on performance as well as storage cost was determined. The results are shown in Appendix C. The data from the noisy-noisy case were used to test the methods since those data represent the most ambitious application. The best 100, 50, and 25 descriptors (best being a function of the method used) were chosen for each database document for word length sequences of 4, 5 and 6 were the features used to form the descriptors.

Performance was measured as before by calculating the average percentages of the correct document getting the highest number of votes, the correct document being one of the top five vote getters, and percentages of votes received to the number of descriptors taken per document for the first and second closest matching documents. The storage cost is calculated by measuring the number of bytes needed for the descriptor database. The storage in the descriptor database for listing the hashed descriptors is constant determined by the number of different hashed descriptors (either the number of possible hashed descriptors or the number of those possible hashed descriptors which do occur in at least one document in systems where hashed descriptors with null linked lists are not stored). The storage needed for the linked lists of document tags is proportional to the number of descriptors taken from each document, since the total number of linked list entries is equal to the number of documents times the average number of descriptors taken from each document. Actually, the number of entries is somewhat smaller if each hashed descriptor is allowed to contribute only one vote per document and feature extraction and hashing a document results in multiple instances of a hashed descriptor. This occurs where a descriptor occurs in more than one place in a document or there is a hash collision of two different descriptors into a single hashed descriptor.

As Appendix C shows, either method provides perfect performance (top vote getter is the correct document in 100% of the test runs) is obtained when 100 either five-word or six-word descriptors are taken from each document or 115 test runs. However, when only 50 or 25 descriptors are taken from each document, the probabilistic method provides better results, and results in an equal or higher percentage of test runs where the correct document gets the highest number of votes, as compared with the frequency weighting method.

The reduction in storage achieved by either method is dramatic. By way of comparison, when all the descriptors are taken from every document and stored (N=570, where N is the average number of descriptors), 628 kilobytes of memory (KB) are needed for the linked lists for descriptors for four-word sequences, 748 KB for descriptors for five-word sequences, and 784 KB for descriptors for six-word sequences. The use of only 100 descriptors per document reduces the storage cost by 84%, to 126 KB, for six-word sequences with no loss in matching performance. The reason more storage is needed for longer word sequences is that a linked list contains only one entry for a document regardless of how many times that list's descriptor (or hashed descriptor) occurs in the document. Longer sequences are less likely to be repeated in a document, and therefore the total number of linked list entries approaches the total number of descriptors taken from the set of 115 documents.

Non-Text Descriptors

While the above methods and apparatus were illustrated with an example of text document images, however they are also applicable to graphic document images and images with combined text and graphics. For example, for graphic or combined images, feature extractors 110 and 210 would include the ability to locate and characterize graphic features. For example, in a specific embodiment, the feature extractor scans the document for regions of high spatial frequency objects or sharp contrast edges. In general, these points are labelled "interesting points". In simpler implementations, text and graphics need not even be discriminated; the text image portions could also contribute interesting points.

To be invariant through translation, rotation and scaling, a descriptor could be used which describes the angular relationship between three or more such interesting points. Additional relationships between interesting points can be used to normalize the descriptor so that it is also invariant of aspect ratio changes.

One method for locating interesting points is to scan the image for rectangular areas, 5 pixel by 5 pixel blocks for example, which have certain spatial frequency components or ranges. A descriptor can then be a description of the spacing of several nearby interesting points, such as a description of the polygon (triangle, square, etc.) formed by the interesting points. The polygon is described either by the lengths of the sides, the angles formed at each point, or a combination thereof, with the values appropriately normalized to make the descriptor transformation invariant.

Contextual Method

The above methods and apparatus provide quick an accurate matching of a query document against a document database using descriptors derived from extracting features such as relative positioning of interesting points and word length sequences. However, in some applications, computational power is extremely limited or increased accuracy is needed. For these applications, a faster converging method is proposed, which uses the apparatus shown in FIGS. 5–7 to replace elements of query engine 200 shown in FIGS. 2 and 3.

FIG. 5 illustrates the organization of descriptor database 116, showing each hashed descriptor followed by a linked list of document tags. The linked list identifies each document in document database 108 from which the hashed descriptor is extracted and saved.

By the way, some descriptors might be extracted and not saved, as explained above, where only "high-quality" descriptors are saved. Also, the term "hashed descriptors" includes, as a subset, the descriptors output by feature extractors 110 and 210, since given the storage space, descriptor database 116 might have separate entries for each descriptor. Logically, this is equivalent to hash generators 114 and 214 hashing through an identity function. In other words, using the above example, the hashing of descriptor values mod 23 can be replaced by hashing the descriptor to its 20-bit value.

In any case, when documents are input to document database 108, features are extracted, descriptors are generated from those features, possibly hashed into hashed descriptors, some or all of the descriptors are saved. A descriptor for a document is "saved" when a document tag identifying that document is added to the linked list for that descriptor in descriptor database 116.

FIG. 5 shows that the descriptor with an ID value of 0x10FC4 is found in two documents, documents tagged "45" and "83". The null symbol signifies the end of the list. In some cases, the storage 502 for descriptor identifiers is not needed, for example if the start of each linked list is placed at a memory location calculable from the descriptor.

FIG. 6 shows a variation 116' on the descriptor database, where a position value is stored for each document tag in the linked list. This position value indicates a position within a document where the features existed which generated that descriptor. This allows for additional matching information to be inferred from the relative positions of descriptor features in a document. Typically, feature extractor 210 scans a document in a particular order, say from left to right and top to bottom. Because of this, it should be expected that sequential descriptors presented to document matcher 216 should be nearby on the query image, and if the correct document is being matched, it too should have features close together. There are exceptions, such as when the right edge of the image is reached and the next descriptor described features on the far left edge, but for the most part descriptors appearing at the document matcher describe features that are near each other on the image.

FIG. 7 shows how this fact is used to increase the speed with which document matcher 216 converges onto the correct document faster than if the relative order of the descriptors was not taken into account. In essence, the relative temporal position of the descriptors forms another descriptor. FIG. 7 shows an accumulator array 304' which is similar to accumulator array 304, with additional storage for the position of the last matching descriptor. The convergence method will now be described.

When feature extractor 110 extracts features and generates a descriptor, it also records a position for the feature, which need not be exact, and passes the position and descriptor on to the hash generator. The hashed descriptor is then used as a pointer to its associated descriptor ID in descriptor database 116'. Once the linked list for that descriptor is located, the document tag for the current document is added as an entry in the linked list, and the position recorded for that descriptor is added to the linked list entry for that document. In this way, the structure shown in FIG. 6 is built up.

When a query is being performed, the positions of descriptors are also extracted along with the features and are passed to document matcher 216. When document matcher 26 retrieves the linked list from descriptor database 116', it also retrieves the position values which indicate where in their respective documents that descriptor is found. Document matcher 216 then updates accumulator array 304 according to what it finds. For each document in the linked list, document matcher 216 compares the position of the descriptor in that document with the position of the last descriptor found in both the query document and that document. This previous position is stored in the "Position of Hit" fields shown in FIG. 7.

If the distance between two descriptors in the document from the document database is below a certain threshold, the count for that document is increased. The increase can be a fixed amount or an amount proportional to the closeness of the two descriptors. The threshold is set to be slightly more than the expected average distance between adjacent descriptors, and the threshold might be adjusted by an initial set of descriptors, so that the threshold is normalized for the query document to eliminate any scaling dependencies, if necessary.

In an alternate embodiment, the count fields maintain a count of the number of consecutive descriptors found in the query document which are located close to each other in a document in the document database. This is convenient in an application where the entire query document is not scanned, but is only scanned until a minimum length sequence of descriptors matching in value and relative position with the value and relative position in a document in the document database is found. The document matching the descriptors and their relative positions would then be deemed the matching document.

The above description is illustrative and not restrictive. Many variations of the invention will become apparent to those of skill in the art upon review of this disclosure. For example, in the above description, documents are usually text and/or images in two dimensions. However, the above methods are not limited to such one- and two-dimensional images, but can be applied to three dimensional images. This would be useful when matching a query CT (computerized tomography) scan, NMR (nuclear magnetic resonance) image, or a hologram to a database of three-dimensional images. Three-dimensional images also include images where the third dimension is provided by a time axis, such as a video sequence. Descriptors would describe features which could span any of the three dimensions. Thus, two video sequences could be matched even when they were taken at different speeds.

The scope of the invention should, therefore, be determined not with reference to the above description, but instead should be determined with reference to the appended claims along with their full scope of equivalents.

| Doc# | Publication | Article Title | Pages scanned | Words Segmented | Split Words | Merged Words |
|---|---|---|---|---|---|---|
| 1 | BioScience V.40 No.10 nov. 1990 pp.738–742 | Humoral Immunity in Insects | 5 | 3688 | 228 | 0 |
| 2 | Business and Society Review Winter 1991 pp.25–32 | Industrial Espionage: What You Don't Know Can Hurt You | 8 | 4412 | 13 | 4 |
| 3 | Communications of the ACM V.33 No.3 March 1990 pp.281–287 | Scaling Up - a Research Agenda for Software Engineering | 7 | 4386 | 160 | 26 |
| 4 | CVGIP-Graphical Models and Image Processing V.53 No.6 Nov. 1991 pp. 522–528 | Winding and Euler Numbers for 2D and 3D Digital Images | 7 | 4280 | 87 | 86 |
| 5 | CVGIP-Image Understanding V.53 No.1 Jan.1991 pp. 1–7 | Rigid Body Motion from Range Image Sequences | 6 | 2809 | 82 | 46 |
| 6 | Geotectonics V.25 No.5 1991 pp.411–415 | Principles of Faulting in the Crust | 5 | 3500 | 98 | 14 |
| 7 | IEEE Computer Graphics and Applications March 1993 pp.28–33 | Landscape Visualization with Emaps | 6 | 3155 | 105 | 9 |
| 8 | IEEE Computer March 1991 pp. 45–55 | Neuronet: A Distributed Real-Time System for Monitoring Neurophysiologic Function in the Medical Environment | 11 | 3182 | 133 | 18 |
| 9 | IEEE Expert April 1993 pp. 13–18 | Using Statistical Methods to Improve Knowledge-Based News Categorization | 6 | 6791 | 270 | 59 |
| 10 | IEEE Expert April 1993 pp. 25–34 | Generating, Integrating, and Activating Thesauri for Concept-Based Document Retrieval | 10 | 4839 | 209 | 37 |
| 11 | Pattern Recognition Letters V.7 1988 pp. 9–12 | A Heuristic Noise Reduction Algorithm Applied to Handwritten Numeric Characters | 4 | 1050 | 28 | 32 |
| 12 | Pattern Recognition V.26 No.3 1993 pp. 419–429 | Normalizing and Restoring On-Line Handwriting | 11 | 4716 | 51 | 92 |
| 13 | Proceedings of the IEEE V.78 No.3 March 1990 pp. 512–525 | Ionospheric Effects on Modern Electronic Systems | 6 | 3405 | 105 | 27 |
| 14 | Proceedings of the IEEE V.79 No.4 April 1991 pp. 403–414 | Memory Systems for Highly Parallel Computers | 8 | 5532 | 40 | 7 |
| 15 | Journal of Spacecraft and Rockets V.29 No.4 July–August 1992 pp. 437–443 | Mobile Transporter Concept for Extravehicular Assembly of Future Spacecraft | 7 | 4312 | 88 | 4 |
| 16 | TREE V.7 No.12 Dec. 1992 pp. 417–419 | Plant Senescence | 3 | 2450 | 85 | 6 |
| 17 | Virology V.194 1993 pp. 277–281 | Purification of the IDIR strain of Group B Rotavirus and Identification of Viral Structural Proteins | 3 | 5053 | 93 | 14 |
| | | Totals | 151 | 65565 | 1875 | 481 |

APPENDIX A. Test Document Database Contents

| Seq. Length | Condition | % cor | % cor5 | Avg Top | Avg 2nd | % cor | % cor5 | Avg Top | Avg 2nd |
|---|---|---|---|---|---|---|---|---|---|
| | | All Sequences | | | | 50 Sequences | | | |
| 4 | Clean-Clean | 100% | 100% | 100% | 19% | 100% | 100% | 100% | 25% |
| 5 | | 100% | 100% | 100% | 5% | 100% | 100% | 100% | 11% |
| 6 | | 100% | 100% | 100% | 3% | 100% | 100% | 100% | 7% |
| 4 | Noisy-Clean | 100% | 100% | 68% | 19% | 100% | 100% | 69% | 26% |
| 5 | | 100% | 100% | 60%. | 5% | 100% | 100% | 62% | 11% |
| 6 | | 100% | 100% | 55% | 3% | 100% | 100% | 56% | 7% |
| 4 | Noisy-Noisy | 100% | 100% | 48% | 18% | 90% | 97% | 43% | 25% |
| 5 | | 100% | 100% | 37% | 5% | 96% | 97% | 32% | 10% |
| 6 | | 100% | 100% | 30% | 3% | 96% | 97% | 25% | 6% |
| | | 25 Sequences | | | | 10 Sequences | | | |
| 4 | Clean-clean | 100% | 100% | 100% | 31% | 100% | 100% | 100% | 46% |
| 5 | | 100% | 100% | 100% | 15% | 100% | 100% | 100% | 26% |
| 6 | | 100% | 100% | 100% | 10% | 100% | 100% | 100% | 17% |
| 4 | Noisy-Clean | 93% | 99% | 71% | 32% | 75% | 84% | 76% | 46% |
| 5 | | 98% | 99% | 64% | 15% | 81% | 88% | 66% | 25% |
| 6 | | 99% | 99% | 58% | 10% | 77% | 83% | 60% | 17% |
| 4 | Noisy-Noisy | 86% | 90% | 53% | 30% | 56% | 67% | 57% | 45% |
| 5 | | 91% | 95% | 41% | 14% | 68% | 73% | 40% | 24% |

| Seq. Length | Condition | % cor | % cor5 | Avg Top | Avg 2nd | % cor | % cor5 | Avg Top | Avg 2nd |
|---|---|---|---|---|---|---|---|---|---|
| 6 | | 88% | 91% | 33% | 10% | 63% | 70% | 31% | 17% |

APPENDIX B. Test Results Averaged Over 115 Query Documents.

| No. of Seqs. Saved | Seq. Length | Frequency Weighting | | | | | Probabilistic | | | | |
|---|---|---|---|---|---|---|---|---|---|---|---|
| | | % cor | % cor5 | Avg Top | Avg 2nd | Stor KB | % cor | % cor5 | Avg Top | Avg 2nd | Stor KB |
| 100 | 4 | 83% | 91% | 9% | 4% | 117 | 98% | 98% | 14% | 5% | 101 |
| | 5 | 99% | 100% | 8% | 1% | 147 | 100% | 100% | 10% | 2% | 120 |
| | 5 | 100% | 100% | 7% | 1% | 148 | 100% | 100% | 8% | 1% | 126 |
| 50 | 4 | 62% | 83% | 4% | 2% | 73 | 87% | 92% | 7% | 3% | 55 |
| | 5 | 98% | 98% | 4% | 1% | 84 | 98% | 99% | 5% | 1% | 64 |
| | 6 | 99% | 100% | 4% | 1% | 83 | 99% | 100% | 4% | 1% | 67 |
| 25 | 4 | 46% | 67% | 2% | 1% | 42 | 57% | 78% | 3% | 2% | 29 |
| | 5 | 89% | 96% | 2% | 1% | 44 | 91% | 97% | 2% | 1% | 33 |
| | 6 | 94% | 95% | 2% | 1% | 44 | 96% | 99% | 2% | 1% | 35 |

APPENDIX C. Test Results of Frequency Weighting Method Queries and Probabilistic Method Queries for Choosing Subsets of Descriptors for a Document.

What is claimed is:

1. An apparatus for matching an input document to a reference document in a document database, comprising:

a document database, wherein reference descriptors are derived from content of reference documents in said document database;

a descriptor database, identifying, for each reference descriptor, a list of reference documents which include content from which said each reference descriptor is derived, the descriptor database including, for each reference document, a plurality of redundant reference descriptors for said each reference document, a reference descriptor being redundant in that said each reference document is identifiable from less than all of said plurality of redundant reference descriptors for said each reference document;

input means for inputting content of an input document to be matched against said reference documents of said document database;

descriptor derivation means, coupled to said input means, for deriving input descriptors from said content of said input document;

accumulation means, coupled to said descriptor database and said descriptor derivation means, for accumulating votes for reference documents in said document database by matching said input descriptors with said reference descriptors, said accumulation means accumulating a vote for each reference document in a list of reference documents associated with a particular reference descriptor when the particular reference descriptor matches an input descriptor; and output means, coupled to said accumulation means, for outputting an indication of at least one matching reference document with a count of accumulated votes larger than a threshold count or larger than a count of accumulated votes for a nonmatching reference document.

2. The apparatus of claim 1, wherein said reference descriptors and said input descriptors are selected to be invariant to translation, rotation and scaling distortions in said document content.

3. The apparatus of claim 1, wherein a set of descriptors for a given document includes descriptor errors, said set of descriptors being a set of reference descriptors when said given document is a reference document and said set of descriptors being a set of input descriptors when said given document is an input document.

4. The apparatus of claim 1, wherein said indication which is output is said at least one matching reference document itself.

5. The apparatus of claim 1, wherein said output means outputs indications of reference documents with a highest number of votes.

6. The apparatus of claim 1, wherein a descriptor, being either a reference descriptor or an input descriptor, is a hash key of a feature indicator which describes a feature of content of a document and a descriptor is a hash key for a plurality of feature indicators.

7. The apparatus of claim 1, wherein at least one descriptor for a text portion of an image is derived from word lengths of consecutive sequences of words and at least one descriptor for a graphic portion of an image is derived from elements of said graphic portion expressed by coordinates which are invariant to scaling, rotation and translation of said graphic portion.

8. The apparatus of claim 7, wherein at least one document is associated with one of said descriptors for a text portion and is associated with one of said descriptors for a graphic portion.

9. The apparatus of claim 1, wherein at least one descriptor for a document is derived from word lengths of consecutive sequences of words in the document.

10. The apparatus of claim 9, wherein the document is a text document.

11. A method for matching an input document to a matching document which is a reference document stored in a document database, comprising the steps of:

deriving reference descriptors from content of the reference documents in the document database, wherein a plurality of reference descriptors derived from a given reference document includes redundant reference descriptors, whereby said given reference document is identifiable from less than all of said plurality of reference descriptors;

storing, for each reference descriptor derived, a list of reference documents which include content from which said each reference descriptor is derived;

inputting content of an input document to be matched against said reference documents of said document database;

identifying features of said input document;

normalizing descriptions of said features if said descriptions are not already invariant to transformations which are present between said input document and said matching document;

deriving input descriptors from said features;

accumulating votes for reference documents of said document database, which includes said matching document, by increasing a vote count for each reference document in a list of reference documents associated with a reference descriptor which matches an input descriptor;

comparing counts of accumulated votes for reference documents having accumulated votes; and outputting an indication of at least one matching reference document which has a count of accumulated votes larger than a threshold count or larger than a count for a nonmatching reference document.

12. The method of claim 11, wherein descriptors for a given document redundantly describe features of said given document.

13. The method of claim 11, further comprising the step of hashing said descriptors to reduce the number of lists of documents required.

14. The method of claim 11, wherein the steps of deriving descriptors from features includes the step of deriving at least one descriptor for a text portion of an image from word lengths of consecutive sequences of words and deriving at least one descriptor for a graphic portion of an image from elements of said graphic portion expressed by coordinates which are invariant to scaling, rotation and translation of said graphic portion.

15. An apparatus for identifying a matching document from a plurality of reference documents, the matching document matching an input document more closely than a nonmatching document from the plurality of reference documents, comprising:

a descriptor database of reference descriptors for the plurality of reference documents, wherein a redundant number of reference descriptors are related to a reference document of the plurality of reference documents, the redundant number of reference descriptors being such that less than all the reference descriptors for the reference document are needed to identify the reference document, wherein a given reference descriptor is related to a given reference document when a feature described by the given reference descriptor is found in a content of the given reference document;

input means for inputting content of the input document;

descriptor derivation means for deriving descriptors from a content of a document, wherein the descriptor derivation means derives input descriptors from the content of the input document;

accumulation means, coupled to the descriptor database and the descriptor derivation means, for accumulating votes for reference documents from the plurality of reference documents, a vote being accumulated for each candidate reference document related to a reference descriptor which matches an input descriptor; and output means, coupled to the accumulation means, for outputting an indication of the matching document by outputting an indication of the candidate reference document having an accumulated vote of more than a threshold count or a count for the nonmatching document.

16. The apparatus of claim 15, wherein at least one descriptor for a text portion of an image is derived from word lengths of consecutive sequences of words.

17. The apparatus of claim 15, wherein said reference descriptors and said input descriptors are selected to be invariant to translation, rotation and scaling distortions in said document content.

18. The apparatus of claim 15, wherein a set of descriptors related to a given document includes descriptor errors, said set of descriptors being a set of reference descriptors when said given document is a reference document and said set of descriptors being a set of input descriptors when said given document is an input document.

* * * * *